United States Patent [19]

Nguyen et al.

[11] Patent Number: 4,636,399
[45] Date of Patent: Jan. 13, 1987

[54] REMOVAL OF ANIONS FROM VEGETABLE MATERIAL

[75] Inventors: Tuan Nguyen, Renens; Pierre Hirsbrunner, Corseaux; Hans Weymuth, La Tour-de-Peilz, all of Switzerland

[73] Assignee: Nestec S. A., Vevey, Switzerland

[21] Appl. No.: 618,388

[22] Filed: Jun. 7, 1984

[51] Int. Cl.$^4$ .......................... A23L 1/212; A23L 1/20
[52] U.S. Cl. .................................. 426/629; 426/425; 426/615
[58] Field of Search ................ 426/615, 425, 656, 531

[56] References Cited

PUBLICATIONS

Hill et al., 1982, J. Agric. Food Chem. 30:465.
Heisler et al., 1974, J. Agric. Food Chem. 22:1029.
Crosby et al., 1976, Adv. in Food Research, 22:8–13.
Cleemput et al., 1983, Soil Biology and Biochemistry, 15:137.
Moraghan et al., 1977, Soil Science Society of America J., 41:47.
Daniels et al., 1955, Physical Chemistry, J. Wiley & Sons, pp. 350–351 and 425–430.
Weast, 1970, Handbook of Chemistry & Physics, CRC Press, pp. D-111 and D-112.

*Primary Examiner*—Raymond N. Jones
*Assistant Examiner*—Carolyn Paden
*Attorney, Agent, or Firm*—Vogt & O'Donnell

[57] ABSTRACT

A process for the removal of nitrate and nitrite ions from a plant material containing such ions which comprises treating the plant material at a temperature of at least 70° C. with a food acceptable ferrous salt in an aqueous acid medium having a pH no greater than 3.

10 Claims, No Drawings

REMOVAL OF ANIONS FROM VEGETABLE MATERIAL

The present invention relates to a method for the removal of certain anions from plant material.

It is well known that vegetables such as carrots and spinach and the edible seeds of certain plants contain nitrate ions which are undesirable because they can be transformed into nitrites.

We have found a very effective process for eliminating both nitrate and nitrite ions from plant material by using a ferrous salt which reduces them to nitrogen gas or volatile oxides of nitrogen. This process is not only exceedingly simple, economic, rapid and efficient but also non-polluting.

Accordingly, the present invention provides a process for the removal of nitrate and nitrite ions from a plant material containing such ions which comprises treating the plant material at a temperature of at least 70° C. with a food-acceptable ferrous salt in an aqueous acid medium having a pH no greater than 3.

The plant material may be any vegetable containing nitrate ions, for instance, carrots, spinach, peas or beans and the treatment of the present invention may conveniently be carried out on such vegetables during a blanching step. Alternatively the plant material may be an edible seed of a plant such as wheat, maize, rice, peanut, sunflower, cottonseed, rape, mustard, ground nut, barley, rye and soya or mixtures thereof and the treatment of the present invention is preferably carried out on seeds which have previously been ground or on materials derived from edible seeds, for example, glutens such as wheat gluten, maize gluten or rice gluten, or the protein residues left behind in the production of edible oils from oily seeds.

The ferrous salt used in the process of the present invention may be any inorganic or organic food-acceptable ferrous salt which gives $Fe^{2+}$ ions in solution and is preferably ferrous sulphate, ferrous chloride or ferrous gluconate. The amount of ferrous salt may be from 0.05% to 5% by weight, preferably from 0.08% to 3.5% by weight and especially from 0.1% to 2.5% by weight based on the weight of plant material being treated.

The amount of the aqueous acid medium is conveniently from 0.5 to 5 times and preferably from 1 to 2.5 times the amount of plant material being treated on a weight for weight basis. The acid medium advantageously has a pH no greater than 2. The acid used should be food-acceptable and is preferably hydrochloric acid. The concentration of the hydrochloric acid is preferably from 0.03% (0.01N, pH2) to 35% (11N, pH0) but is preferably from 3.2% to 32% i.e. from 1N to 10N where the pH is 0.

The temperature required for reducing nitrite may be as low as 10° C. but as the temperature required for reducing nitrate is at least 70° C., this is the minimum temperature usually employed for removing both nitrate and nitrite ions in the process of the present invention. Preferably, to reduce both nitrates and nitrites, the temperature used is from 80° C. to 120° C. more preferably from 90° C. to 115° C. and especially from 95° C. to 113° C. The maximum temperature used is generally chosen so that the food does not suffer any detrimental effects and is generally no higher than 130° C.

The duration of the treatment necessary for removing substantially all the nitrate and nitrite ions is quite short and in an open vessel can be as short as 2 minutes. Periods of from 5 to 15 minutes are usually employed in an open vessel, where evaporation of the formed gases can occur but in a closed vessel the time required to remove substantially all the nitrate and nitrite is a little longer, usually from 15 to 60 minutes. In practice, the maximum period is about 2 hours. Longer periods of time e.g. up to 8 hours, may be used for the treatment but longer periods are usually unnecessary or uneconomical.

Advantageously, a small amount of an amino acid or a mixture comprising free amino acids may be added to speed the process even further. For example, the amount of amino acid used may be from 0.01% to 5% by weight, preferably from 0.02% to 2% by weight and especially from 0.03% to 1% by weight based on the weight of plant material.

When the process of the invention is used to treat seed material, after the nitrate and nitrite ions have been removed the treated product may be cooled and neutralised for example with sodium bicarbonate and then treated to remove the iron, for example with phosphoric acid to give insoluble ferric phosphate which may conveniently be filtered off.

When used for treating seed materials, the process of the invention is simple, efficient and economic because the nitrate and nitrite ions are converted to nitrogen gas or volatile oxides of nitrogen which can easily escape. After the treatment has been completed, the treated seed material is concentrated to give a product with an agreeable flavour which has in no way been affected by the treatment of the present invention.

The present invention is further illustrated by the following Examples.

EXAMPLE 1

100 g of fresh spinach were chopped in pieces having an average size of about 5 cm. The spinach was then immersed in a beaker containing 500 ml of boiling water acidified to pH 2 with hydrochloric acid. Immediately 2.4 g of ferrous sulphate $FeSO_4.7H_2O$ and 0.6 g of a mixture of free amino acids were successively added to the spinach suspension and the boiling continued for 3 minutes. The water was drained off. The nitrite and nitrate content of the spinach were determined by conventional methods before and after the treatment. The results obtained are shown as follows:

The spinach contained

|  | $NO_2^-$ (ppm) | $NO_3^-$ (ppm) |
| --- | --- | --- |
| before treatment | 0.5 | 800. |
| after treatment | 0.0 | 20. |

EXAMPLE 2

40 g of ground sunflower seed were poured in a beaker containing 100 ml of boiling 22% hydrochloric acid. Immediately 0.1 g of ferrous sulphate $FeSO_4.7H_2O$ and 0.04 g of a mixture of free amino acids were successively added to the suspension and the boiling continued for 10 minutes under slight stirring.

The nitrite and nitrate content of untreated and treated ground sunflower seed were determined by conventional methods. The results obtained are shown as follows:

|  | $NO_2^-$ (ppm) | $NO_3^-$ (ppm) |
| --- | --- | --- |
| untreated ground seed | 0.0 | 17. |
| treated ground seed | 0.0 | 5. |

What is claimed is:

1. A process for removing nitrate and nitrite ions from an edible plant material containing such ions comprising combining the plant material and from 0.05% to 5% by weight of a food-acceptable ferrous salt, based upon the weight of the plant material, and an aqueous acid medium having a pH no greater than 3 at a temperature of at least 70° C. for a period of time sufficient to remove nitrate and nitrite ions from the plant material.

2. A process according to claim 1 wherein the plant material is a vegetable.

3. A process according to claim 1 wherein the plant material is a material derived from edible seeds.

4. A process according to claim 1 wherein the plant material is derived from seeds of the plant material selected from the group consisting of wheat gluten, maize gluten, rice gluten and protein residue of a de-oiled oily edible seed and combinations thereof.

5. A process according to claim 1 wherein the amount of ferrous salt used is from 0.1% to 2.5% by weight based on the weight of plant material being treated.

6. A process according to claim 1 wherein the ferrous salt is ferrous sulphate.

7. A process according to claim 1 wherein the amount of aqueous acid medium is from 1 to 2.5 times the amount of plant material being treated on a weight for weight basis.

8. A process according to claim 1 wherein the acid medium is 1N to 10N hydrochloric acid.

9. A process according to claim 1 wherein the temperature used for the treatment is from 80° C. to 120° C.

10. A process according to claim 1 further comprising adding from 0.01% to 5% by weight based upon the weight of the plant material of at least one amino acid to the plant material, ferrous salt and acid medium.

* * * * *